US012757286B2

(12) United States Patent
Liang et al.

(10) Patent No.: US 12,757,286 B2
(45) Date of Patent: Oct. 6, 2026

(54) DISCONTINUOUS RECEPTION METHOD AND APPARATUS, AND TERMINAL

(71) Applicant: VIVO MOBILE COMMUNICATION CO., LTD., Dongguan (CN)

(72) Inventors: Jing Liang, Dongguan (CN); Qian Zheng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 377 days.

(21) Appl. No.: 18/369,555

(22) Filed: Sep. 18, 2023

(65) Prior Publication Data

US 2024/0008142 A1 Jan. 4, 2024

Related U.S. Application Data

(63) Continuation of application No. PCT/CN2022/080638, filed on Mar. 14, 2022.

(30) Foreign Application Priority Data

Mar. 17, 2021 (CN) ........................ 202110285323.X

(51) Int. Cl.
*H04W 76/28* (2018.01)
*H04W 72/02* (2009.01)
*H04W 72/25* (2023.01)

(52) U.S. Cl.
CPC ........... *H04W 76/28* (2018.02); *H04W 72/02* (2013.01); *H04W 72/25* (2023.01)

(58) Field of Classification Search
CPC ..... H04W 76/02; H04W 72/02; H04W 72/25; H04W 92/18; H04W 24/02; H04W 24/08;
(Continued)

(56) References Cited

U.S. PATENT DOCUMENTS

2020/0275474 A1 8/2020 Chen
2021/0014028 A1 1/2021 You et al.
(Continued)

FOREIGN PATENT DOCUMENTS

CN 110351898 A 10/2019
CN 111148077 A 5/2020
(Continued)

OTHER PUBLICATIONS

CATT, "Sidelink DRX Timer Maintenance and Active Time Definition", 3GPP TSG-RAN WG2 Meeting #113, Electronic, Jan. 25-Feb. 5, 2021, R2-2100236.
(Continued)

*Primary Examiner* — Ayanah S George
(74) *Attorney, Agent, or Firm* — The Webb Law Firm

(57) ABSTRACT

A discontinuous reception method includes performing sidelink-based discontinuous reception for a second terminal according to first indication information and/or first configuration information for discontinuous reception. The first configuration information includes configuration information of a timer, and the timer is used to indicate whether the first terminal needs to monitor control signaling and/or data from the second terminal. The first indication information includes sidelink control information and is used to indicate the first terminal to receive a first resource for initial transmission and retransmission and/or a feedback resource.

13 Claims, 7 Drawing Sheets

(58) Field of Classification Search
CPC .. H04W 72/563; H04L 5/0055; H04L 5/0094; H04L 1/1854; H04L 1/1864; H04L 1/1812; H04L 1/1848; H04L 5/0053
See application file for complete search history.

(56) References Cited

U.S. PATENT DOCUMENTS

| | | | |
|---|---|---|---|
| 2021/0250131 A1 | 8/2021 | Fan et al. | |
| 2022/0174781 A1 | 6/2022 | Yang et al. | |
| 2022/0272789 A1 * | 8/2022 | Wang | H04W 76/14 |
| 2022/0295514 A1 * | 9/2022 | Shin | H04W 52/0216 |
| 2022/0312241 A1 | 9/2022 | Xu et al. | |

FOREIGN PATENT DOCUMENTS

| | | |
|---|---|---|
| CN | 111556590 A | 8/2020 |
| CN | 111615085 A | 9/2020 |
| CN | 112399644 A | 2/2021 |
| WO | 2018028279 A1 | 2/2018 |
| WO | 2021032194 A1 | 2/2021 |

OTHER PUBLICATIONS

“Report of [Post109bis-e][957][V2X]: MAC issues (LG)”, Jun. 2020, pp. 1-97, LG Electronics Inc.

Fujitsu, “Reservation Chain-based DRX Power Saving”, 3GPP TSG RAN WG2 Meeting #113-e, e-Meeting, Jan. 25-Feb. 5, 2021, R2-2100421.

* cited by examiner

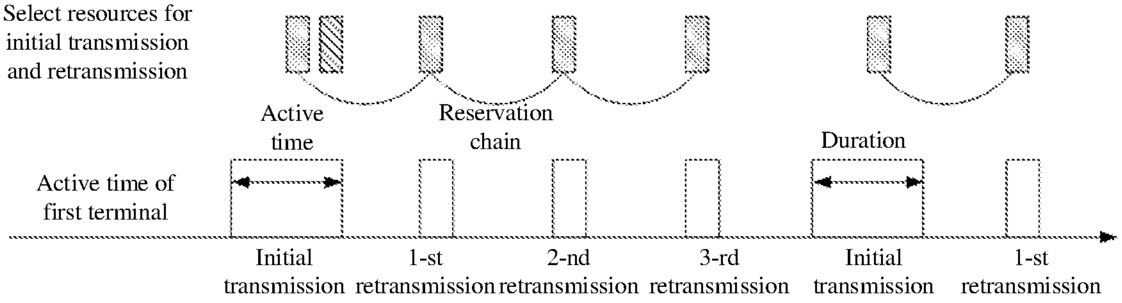

FIG. 3

S401

In a case that first configuration information includes configuration information of a first timer and/or configuration information of a second timer, perform sidelink-based discontinuous reception based on the first timer, where the first timer is used to indicate that a first terminal does not need to monitor control signaling and/or data from a second terminal during running of the first timer, the configuration information of the first timer includes a first duration used for indicating a timing length of the first timer, and the second timer is used to indicate that the first terminal needs to monitor the control signaling and/or data from the second terminal during running of the second timer

FIG. 4

DISCONTINUOUS RECEPTION METHOD AND APPARATUS, AND TERMINAL

CROSS-REFERENCE TO RELATED APPLICATIONS

This application is a Bypass Continuation Application of International Patent Application No. PCT/CN2022/080638 filed Mar. 14, 2022, and claims priority to Chinese Patent Application No. 202110285323.X filed Mar. 17, 2021, the disclosures of which are hereby incorporated by reference in their entireties.

BACKGROUND OF THE INVENTION

Field of the Invention

This application pertains to the field of mobile communication technologies, and particularly relates to a discontinuous reception method and apparatus, and a terminal.

Description of Related Art

Sidelink transmission mainly has several transmission forms: broadcast, groupcast, and unicast. Unicast is one-to-one transmission, groupcast is one-to-many transmission, and broadcast is also one-to-many transmission. However, for broadcast, there is no concept of terminals (for example, user equipment (UE)) belonging to a same group. Currently, sidelink unicast communication and groupcast communication support the physical layer hybrid automatic repeat request (HARQ) feedback mechanism.

SUMMARY OF THE INVENTION

According to a first aspect, a discontinuous reception method is provided, performed by a first terminal and including:

- performing sidelink-based discontinuous reception for a second terminal according to first indication information and/or first configuration information for discontinuous reception, where the first configuration information includes configuration information of a timer, the timer is used to indicate whether the first terminal needs to monitor control signaling and/or data from the second terminal, and the first indication information includes sidelink control information and is used to indicate the first terminal to receive a first resource for initial transmission and retransmission and/or a feedback resource.

According to a second aspect, a discontinuous reception apparatus is provided, including:

- a first configuration module, configured to obtain first indication information and/or first configuration information for discontinuous reception; and
- a first execution module, configured to perform sidelink-based discontinuous reception for a second terminal according to first indication information and/or first configuration information for discontinuous reception, where the first configuration information includes configuration information of a timer, the timer is used to indicate whether the first terminal needs to monitor control signaling and/or data from the second terminal, and the first indication information includes sidelink control information and is used to indicate the first terminal to receive a first resource for initial transmission and retransmission and/or a feedback resource.

According to a third aspect, a discontinuous reception method is provided, performed by a second terminal and including:

- performing resource selection or reselection based on first configuration information for discontinuous reception and/or a resource on which feedback information is located; where the first configuration information includes configuration information of a timer, and the timer is used to indicate whether a first terminal needs to monitor control signaling and/or data from the second terminal.

According to a fourth aspect, a discontinuous reception apparatus is provided, including:

- a second configuration module, configured to obtain first configuration information for discontinuous reception and/or a resource on which feedback information is located; and
- a second execution module, configured to perform resource selection or reselection based on the first configuration information for discontinuous reception and/or the resource on which the feedback information is located; where the first configuration information includes configuration information of a timer, and the timer is used to indicate whether a first terminal needs to monitor control signaling and/or data from a second terminal.

According to a fifth aspect, a terminal is provided, where the terminal includes a processor, a memory, and a program or instructions stored in the memory and executable on the processor, and when the program or the instructions are executed by the processor, the steps of the method according to the first aspect are implemented.

According to a sixth aspect, a terminal is provided, where the terminal includes a processor, a memory, and a program or instructions stored in the memory and executable on the processor, and when the program or the instructions are executed by the processor, the steps of the method according to the third aspect are implemented.

According to a seventh aspect, a non-transitory computer-readable storage medium is provided, where a program or instructions are stored in the non-transitory computer-readable storage medium, and when the program or the instructions are executed by a processor, the steps of the method according to the first aspect are implemented, or the steps of the method according to the third aspect are implemented.

According to an eighth aspect, a chip is provided, where the chip includes a processor and a communication interface, the communication interface is coupled to the processor, and the processor is configured to execute a program or instructions to implement the method according to the first aspect or implement the method according to the third aspect.

According to a ninth aspect, a computer program/program product is provided, where the computer program/program product is stored in a non-volatile storage medium, and the program/program product is executed by at least one processor to implement the steps of the discontinuous reception method according to the first aspect.

BRIEF DESCRIPTION OF THE DRAWINGS

FIG. 3 is a schematic diagram of allocation of first resources according to an embodiment of this application;

FIG. 4 is another schematic flowchart of a discontinuous reception method according to an embodiment of this application;

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
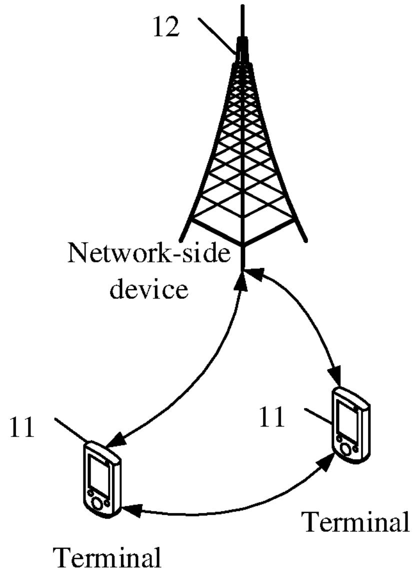
FIG. 1 is a schematic structural diagram of a wireless communication system to which the embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a type of the base station is not limited.

The following describes in detail a discontinuous reception method provided in the embodiments of this application by using some embodiments and application scenarios thereof with reference to the accompanying drawings.

Usually, there are a total of two resource allocation modes for sidelink UEs: (1) Base station scheduling mode (Mode 1): BS schedules SL resource(s) to be used by UE for SL transmission(s). A network-side device, such as a base station, controls and allocates resources for each UE. (2) UE autonomous mode (Mode 2): UE determines, for example, BS does not schedule, SL transmission resource(s) within SL resources configured by BS/network or pre-configured SL resources. Each UE autonomously selects resources.

Discontinuous reception (DRX) is introduced into sidelink; however, in sidelink DRX, a receive end may fail to receive information from a transmit end normally.

Figure 2:
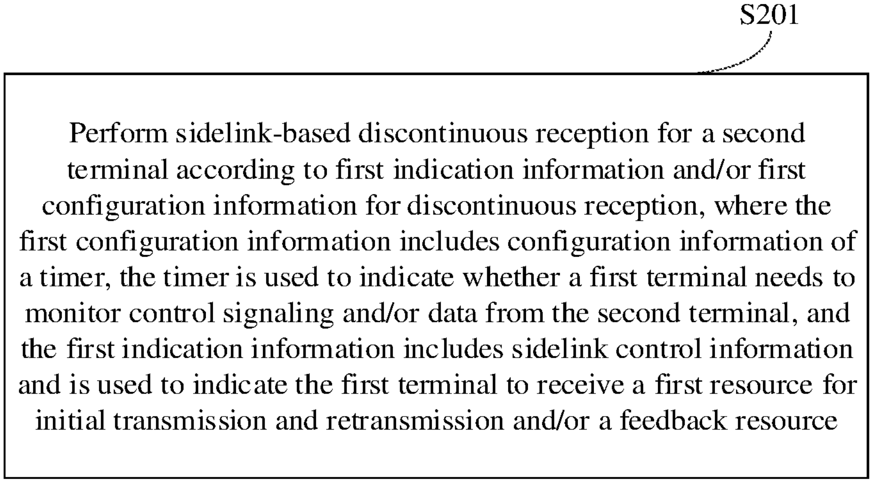
FIG. 2 is a schematic flowchart of a discontinuous reception method according to an embodiment of this application.

FIG. 2 is a schematic flowchart of a discontinuous reception method according to an embodiment of this application. As shown in FIG. 2, the method may be executed by a first terminal, and for example, may be executed by software or hardware installed in the first terminal. The first terminal is a receive end in sidelink, and receives data sent by a second terminal serving as a transmit end. The method may include the following step.

Step S201: Perform sidelink-based discontinuous reception for the second terminal according to first indication information and/or first configuration information for discontinuous reception, where the first configuration information includes configuration information of a timer, the timer is used to indicate whether the first terminal needs to monitor control signaling and/or data from the second terminal, and the first indication information includes sidelink control information (SCI) and is used to indicate the first terminal to receive a first resource for initial transmission and retransmission and/or a feedback resource.

The first configuration information for DRX obtained by the first terminal includes HARQ round-trip time (RTT) related configuration, including configuration information of timers, for example, a first timer or a second timer. During running of the first timer, the first terminal does not need to monitor related control signaling on a channel and/or data sent from the second terminal, and the first timer may be denoted by Drx-HARQ-RTT-TimerSL. During running of the second timer, the first terminal needs to monitor related control signaling in a channel and/or data sent from the second terminal, and the second timer may be denoted by DRX-RetransmissionTimerSL.

It should be understood that the first timer Drx-HARQ-RTT-TimerSL:sidelink is used to indicate how long to wait at least after sending a feedback message and before receiving a retransmission, which is similar to Uu drx-HARQ-RTT-Timer. The name herein is only an example.

The second timer Drx-RetransmissionTimerSL:sidelink is used to indicate that monitoring on physical sidelink control channel (PSCCH) or physical sidelink shared channel PSSCH needs to be performed, so as to monitor retransmission to be probably received, which is similar to Uu drx-RetransmissionTimer. The name herein is only an example as well.

The first indication information is used to indicate the first resource reserved for receiving initial transmission and retransmission by the first terminal. As shown in FIG. 3, positions of dotted blocks are reserved first resources indicated by the first indication information.

Correspondingly, during resource selection or reselection, based on the first configuration information and/or the resource on which the received feedback information is located, the second terminal determines the second resource corresponding to a time at which the first terminal does not need to monitor control signaling and/or data, and then performs resource selection or reselection based on the second resource. The control signaling includes SCI on PSCCH and/or PSSCH.

Therefore, this embodiment of this application provides a discontinuous reception method, where sidelink-based discontinuous reception is performed for the second terminal according to the first configuration information for discontinuous reception and/or the first indication information, so that the first terminal can accurately receive the control signaling and/or data sent by the second terminal.

FIG. 4 is another schematic flowchart of a discontinuous reception method according to an embodiment of this application. As shown in FIG. 4, the method may include the following step.

Step S401: In a case that first configuration information includes configuration information of a first timer and/or configuration information of a second timer, perform sidelink-based discontinuous reception based on the first timer; where the first timer is used to indicate that a first terminal does not need to monitor control signaling and/or data from a second terminal during running of the first timer, the configuration information of the first timer includes a first duration used for indicating a timing length of the first timer, and the second timer is used to indicate that the first terminal needs to monitor the control signaling and/or data from the second terminal during running of the second timer.

In an implementation, the first configuration information includes explicit configuration information of the first timer and/or explicit configuration information of the second timer, that is, the first duration of the first timer Drx-HARQ-RTT-TimerSL and/or a second duration of the second timer Drx-RetransmissionTimerSL is configured in the first configuration information, and the unit is millisecond (ms) or slot.

The first duration is determined based on at least one of the following:

- duration between two adjacent first resources;
- duration between a resource for sending feedback information and a next first resource;
- configuration made by a base station;
- specification by protocol; or
- configuration made by the second terminal.

Equivalently, as shown in FIG. 3, in an implementation, the first duration may be a length between two adjacent dotted blocks.

In another implementation, the first duration may alternatively be a length between an oblique-lined block and a next dotted block, and in this case, a start time of the first timer is after a resource for sending feedback channel.

In another implementation, the first duration may alternatively be a value configured by a base station, a terminal, or a protocol, and the unit is ms or slot.

Optionally, step S401 includes:

- starting the first timer at a first time; and
- starting the second timer after the first timer exceeds the first duration; where
- the first time is after at least one of the following time:
- the (n−1)-th first resource;
- a first quantity of symbols or slots after the (n−1)-th first resource;
- a resource on which feedback information sent for the (n−1)-th first resource is located; or
- a second quantity of symbols or slots after the resource on which the feedback information sent for the (n−1)-th first resource is located.

In an implementation, the first terminal starts the first timer upon reception of the (n−1)-th first resource, and a timing length of the first timer is set to a first duration of A slots. Correspondingly, during resource selection or reselection, the second terminal is not allowed to select a resource within A slots after the (n−1)-th first resource.

The first duration may be less than or equal to a length between the (n−1)-th first resource and the n-th first resource. After the timing of the first timer exceeds the first duration, the second timer can be started, and a timing length of the second timer is set to a second duration, which may be a length of the n-th first resource. Correspondingly, in this case, a resource selected or reselected by the second terminal needs to fall within the n-th first resource.

If the first duration is less than the length between the (n−1)-th first resource and the n-th first resource, the second duration may be greater than the length of the n-th first resource, which may be the n-th first resource plus previous B slots. Correspondingly, in this case, a resource selected or reselected by the second terminal needs to fall within the total length of the n-th first resource plus previous B slots.

In another implementation, the first terminal may start the first timer after a first quantity of symbols or slots have elapsed upon reception of the (n−1)-th first resource, for example, starting the first timer after C slots, where the first duration is D slots. Correspondingly, in this case, during resource selection or reselection, the second terminal is not allowed to select a resource in the D slots. The second timer is still started after the first timer expires and has a length of the n-th first resource plus next C slots. Correspondingly, in this case, a resource selected or reselected by the second terminal needs to fall within the length of the n-th first resource plus next C slots.

If the second duration is a total length of the n-th first resource plus the previous B slots and next C slots, correspondingly, in this case, a resource selected or reselected by the second terminal needs to fall within the total length of the n-th first resource plus the previous B slots and next C slots.

In another implementation, the first terminal may start the first timer after the resource on which the feedback information sent for the (n−1)-th first resource is located, and the first duration is a length between the resource on which the feedback channel is located and the n-th first resource. The second timer is started after the first timer expires, and the length of the second timer may be the length of the n-th first resource. Correspondingly, in this case, a resource selected or reselected by the second terminal needs to fall within the n-th first resource.

If the first duration is less than a length between the resource on which the feedback channel is located and the n-th first resource, the second duration may be greater than the length of the n-th first resource, which may be the n-th first resource plus previous B slots. Correspondingly, in this case, a resource selected or reselected by the second terminal needs to fall within the total length of the n-th first resource plus previous B slots.

In another implementation, the first terminal may start the first timer in a second quantity of symbols or slots after the resource on which the feedback information sent for the (n−1)-th first resource is located, for example, starting the first timer in E slots, where the first duration is F slots. Correspondingly, in this case, during resource selection or reselection, the second terminal is not allowed to select a resource in the F slots. The second timer is still started after the first timer expires and has a length of the n-th first resource plus next E slots. Correspondingly, in this case, a resource selected or reselected by the second terminal needs to fall within the length of the n-th first resource plus next E slots.

If the second duration is a total length of the n-th first resource plus the previous B slots and next C slots, correspondingly, a resource selected or reselected by the second terminal needs to fall within the total length of the n-th first resource plus the previous B slots and next C slots.

Optionally, if SCI with reservation chain included is received again when the second timer is running, that is, a new first resource is indicated, the first terminal turns off the second timer and performs DRX based on the new first resource.

Optionally, during starting of the second timer, the method further includes:

in a case that the m-th first resource having been occupied or requiring re-evaluation due to pre-emption or re-evaluation is detected, changing the timing length of the second timer from the second duration to a third duration, or keeping the second timer running until new control signaling and/or data is received; where the m-th first resource is the n-th first resource or is a first resource later than the n-th first resource.

Being occupied as detected by the first terminal may be caused by failure in receiving any PSCCH/PSSCH transmission, or reception of PSCCH/PSSCH transmission from other UEs, or failure in PSCCH/PSSCH demodulation.

In an implementation, when the first terminal starts the second timer before and after the n-th first resource, if it is detected that the n-th first resource has been occupied or requires re-evaluation due to pre-emption or re-evaluation, the second duration of the second timer can be changed from the second duration of X slots to the third duration of Y slots, or the second timer can be kept running until new control signaling and/or data is received, and then DRX is performed according to the new control signaling and/or data. When the timing length of the second timer is changed from the second duration to the third duration, the new control signaling and/or data is required to fall within a range of the third duration.

In another implementation, the first terminal detects at the (n−1)-th first resource and the (n−T)-th first resource that the n-th, (n+1)-th, . . . first resources have been occupied or need to be re-evaluated due to pre-emption or re-evaluation. The (n−T)-th first resource is a position of T duration prior to the n-th first resource. In this case, the UE does not start the first timer or starts the second timer immediately and sets the second duration to be Y slots, or keeps the second timer running until new control signaling and/or data is received, and then performs DRX according to the new control signaling and/or data. When the timing length of the second timer is changed from the second duration to the third duration, the new control signaling and/or data is required to fall within a range of the third duration. T may be a value prescribed by the protocol, configured by the base station, or configured by the second terminal.

Correspondingly, the second terminal may perform resource selection or reselection based on the first configuration information for discontinuous reception and/or a resource on which received feedback information is located; where the first configuration information includes configuration information of a timer, and the timer is used to indicate whether a first terminal needs to monitor control signaling and/or data from the second terminal.

Optionally, in a case that the first configuration information includes configuration information of the first timer and/or configuration information of the second timer, a position of a second resource is determined based on the first timer and/or the resource on which feedback information is located, where the second resource is a transmission resource corresponding to a time of running the first timer of the first terminal. For example, the manner for determining the position of the second resource is as follows:

in a case that the first configuration information includes the configuration information of the first timer, for example, the position of the resource on which the feedback information is located is slot A, the number of slots corresponding to the first duration in the configuration information of the first timer is X. The first duration may be converted into the number of slots through ms, or may be directly configured as the number of slots. In this case, within the X slots after slot A, the second terminal will not select these slots as optional transmission resources, that is, transmission resources corresponding to these slots are determined as the second resource. The X slots may be physical slots or logical slots. The logical slots may alternatively be all slots that may be used for sidelink, and slots that belong to a sidelink resource pool.

During resource selection or reselection, the second terminal excludes the position of the obtained second resource from the optional transmission resources of the second terminal. The excluding transmission resources may be in the following two manners:

1. During reporting of optional resources at the physical layer, the physical layer excludes these unsuitable resources and then reports remaining resources to the medium access control (MAC) layer, and the MAC layer randomly selects a resource therefrom. In this case, the MAC layer needs to first determine the second resource of the second terminal corresponding to a time of running Drx-HARQ-RTT-TimerSL of the first terminal, and then notifies the second resource to the physical layer. Then, the physical layer excludes the second resource during selection of candidate resources and reports usable resources to the MAC layer, and the MAC layer finally selects a transmission resource. 2. Another practice is that after the physical layer reports candidate resources, the MAC layer directly excludes unsuitable resources, and then makes selection randomly. If the MAC layer has no enough resources to choose after performing exclusion, resource reselection is triggered.

Optionally, during resource selection or reselection, the second terminal may not exclude the second resource first, and if a selected or reselected transmission resource belongs to the second resource, discards the transmission resource or triggers a reselection process.

Therefore, this embodiment of this application provides a discontinuous reception method, where sidelink-based discontinuous reception is performed based on the first timer, so that the first terminal can accurately receive the control signaling and/or data sent by the second terminal.

Figure 5:
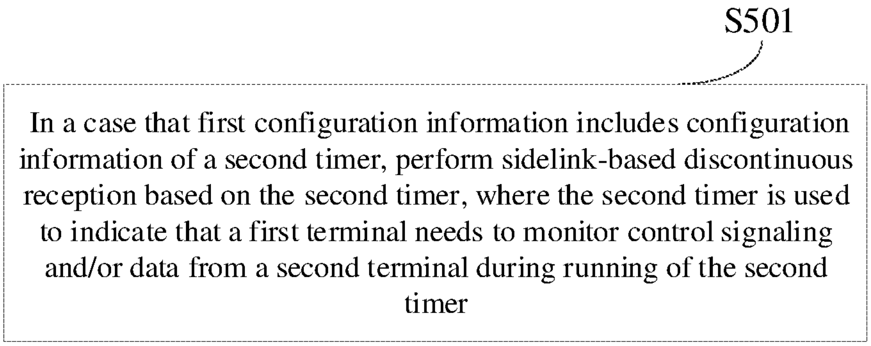
FIG. 5 is another schematic flowchart of a discontinuous reception method according to an embodiment of this application.

FIG. 5 shows another schematic flowchart of a discontinuous reception method according to an embodiment of this application. As shown in FIG. 5, a first timer is not defined in this embodiment of this application, and the method may include the following step.

Step S501: In a case that first configuration information includes configuration information of a second timer, perform sidelink-based discontinuous reception based on the second timer; where the second timer is used to indicate that a first terminal needs to monitor control signaling and/or data from a second terminal during running of the second timer.

Optionally, step S501 includes:

in a case that the first configuration information includes the configuration information of the second timer, performing sidelink-based discontinuous reception based on the second timer; where the second timer is used to indicate that the first terminal needs to monitor the control signaling and/or data from the second terminal during running of the second timer.

Optionally, the performing sidelink-based discontinuous reception based on the second timer includes:

starting the second timer on each first resource, where a second duration of the second timer is determined based on at least one of the following:

length of the first resource;

configuration made by a base station;

specification by protocol; or configuration made by the second terminal.

Optionally, in a case that the second timer is started, the method further includes: in a case that the m-th first resource having been occupied, due to pre-emption or re-evaluation, is detected, starting the second timer and setting a timing length of the second timer to a third duration, or keeping the second timer running until new control signaling and/or data is received; where the m-th first resource is the n-th first resource or is a first resource later than the n-th first resource.

In an implementation, if the first terminal detects at the n-th first resource that the n-th first resource has been occupied or requires re-evaluation due to pre-emption or re-evaluation, the first terminal immediately starts the second timer, with the second duration being X slots, or keeps the second timer running until new control signaling and/or data is received, and performs DRX according to the new control signaling and/or data.

Figure 6:
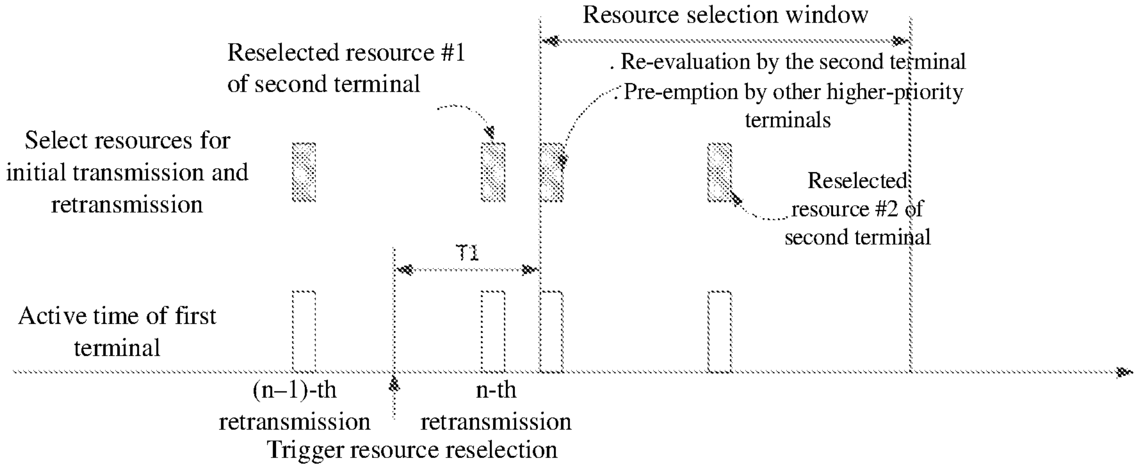
FIG. 6 is a schematic diagram of a resource reselection method according to an embodiment of this application.

Correspondingly, in this case, during resource selection or reselection, the second terminal is not allowed to select a resource between the (n−1)-th first resource and the n-th first resource, which may be implemented by setting a length of T1 before a resource selection window. As shown in FIG. 6, the length of T1 is set, so that the reselected resource of the second terminal is located within the resource selection window, for example, reselected resource #2.

If the second duration of the second timer is set to X slots, a resource selected or reselected by the second terminal needs to fall within the X slots.

In another implementation, if the first terminal detects at the (n−1)-th first resource or the (n−T)-th first resource that the n-th, (n+1)-th, . . . first resources have been occupied or requires re-evaluation due to pre-emption or re-evaluation, the first terminal immediately starts the retransmission timer, with the second duration being X slots, or keeps the second timer running until new control signaling and/or data is received, and performs DRX according to new resource reservation information.

Correspondingly, during resource selection or reselection, the second terminal is not allowed to select a resource between the (n−1)-th first resource and the n-th first resource, which may be implemented by setting a length of T1 before the resource selection window. If the second duration of the second timer is set to X slots, a resource selected or reselected by the second terminal needs to fall within the X slots.

Therefore, this embodiment of this application provides a discontinuous reception method, where sidelink-based discontinuous reception is performed based on the second timer, so that the first terminal can accurately receive the control signaling and/or data sent by the second terminal.

Figure 7:
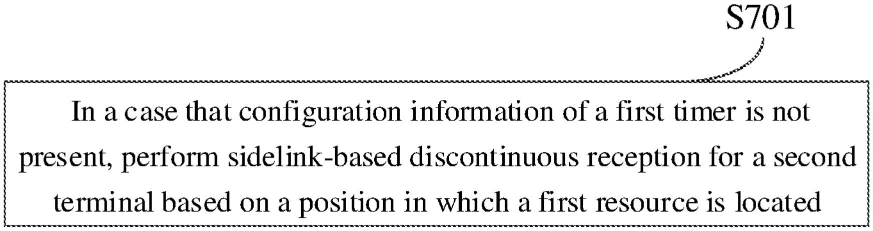
FIG. 7 is another schematic flowchart of a discontinuous reception method according to an embodiment of this application.

FIG. 7 shows another schematic flowchart of a discontinuous reception method according to an embodiment of this application. As shown in FIG. 7, a first terminal performs DRX not based on a timer in this embodiment of this application, and the method may include the following step.

Step S701: In a case that configuration information of a first timer is not present, perform sidelink-based discontinuous reception for a second terminal based on a position in which a first resource is located.

Optionally, step S701 includes at least one of the following:

monitoring control signaling and/or data from the second terminal at a position in which the n-th first resource is located; or not requiring to monitoring control signaling and/or data from the second terminal at a position in which the first resource is not located.

Optionally, the method further includes:

in a case that the m-th first resource having been occupied, due to pre-emption or re-evaluation, is detected, monitoring control signaling and/or data for a fourth duration or until new control signaling and/or data is received; where the m-th first resource is the n-th first resource or a first resource later than the n-th first resource.

In an implementation, if the first terminal detects that the n-th first resource has been occupied or requires re-evaluation due to pre-emption or re-evaluation, the UE enters DRX active time with a length of M slots, that is, starts monitoring control signaling and/or data on the channel, or keeps monitoring until new control information and/or data is received, and then performs DRX according to the control information and/or data.

Correspondingly, during resource reselection, the second terminal is not allowed to select a corresponding resource between the (n−1)-th first resource and the n-th first resource, which may be implemented by setting a length of T1 before the resource selection window. If a length for monitoring the control signaling and/or data on the channel is set to a fourth duration of M slots, a resource reselected by the second terminal needs to fall within the M slots. For example, a distance between any two selected resources of the second terminal may be set to be less than M, and the selected resources of the second terminal correspond to reselection or packet loss triggered by at least one of preemption, prioritization, and congestion control.

In another implementation, if the first terminal detects at the (n−1)-th first resource that the n-th, (n+1)-th, . . . first resources have been occupied or require re-evaluation due to pre-emption or re-evaluation, the first terminal enters DRX active time, with a length of K slots, or keeps monitoring until new control information and/or data is received, and then performs DRX according to the new control information and/or data.

Correspondingly, in this case, the second terminal may select a resource between the (n−1)-th first resource and the n-th first resource. If a length for monitoring the control signaling and/or data on the channel is set to K slots, a resource reselected by the second terminal needs to fall within the K slots. For example, a distance between any two selected resources of the second terminal may be set to be less than M, and the selected resources of the second terminal correspond to reselection or packet loss triggered by at least one of preemption, prioritization, and congestion control.

For the second terminal side, optionally, in a case that the configuration information of the first timer is determined based on first indication information, a position of the second resource is determined based on first information, where the second resource is a transmission resource corresponding to a time period in which the first terminal does not need to monitor control signaling and/or data.

A transmission resource other than the second resource is selected in a resource selection or reselection process.

The first information includes at least one of the following:

- first indication information, that is, indication information for configuring the first timer of the first terminal;
- positions of an initial-transmission resource and a retransmission resource selected during last resource selection; or
- a position of the resource on which the feedback information is located.

If the second terminal triggers resource selection or reselection, for example, triggering based on pre-emption or re-evaluation, a new transmission resource satisfies at least one of the following:

- not being between a feedback resource selected during the last resource selection and one or several originally expected retransmission resources;
- not being between an initial-transmission resource selected during the last resource selection and one or several retransmission resources; or
- not being between a specific retransmission resource selected during the last resource selection and next one or more retransmission resources.

Therefore, this embodiment of this application provides a discontinuous reception method, where sidelink-based discontinuous reception for the second terminal is performed based on the position in which the first resource is located, so that the first terminal can accurately receive the control signaling and/or data sent by the second terminal.

Based on the foregoing embodiments, if the second terminal does not exclude the second resource during resource selection or reselection, optionally, in step S401, after starting of the first timer, the method further includes:

- after second indication information is received from the base station or the second terminal, stopping the first timer and monitoring control signaling and/or data; where the second indication information is used for at least one of the following:
- indicating that the second terminal has performed a resource selection or reselection process;
- indicating that the second terminal has triggered a resource selection or reselection process due to pre-emption;
- indicating that the second terminal has triggered a resource selection or reselection process due to re-evaluation;
- indicating monitoring control signaling and/or data, that is, indicating that the first terminal enters DRX active time;
- indicating turning off the first timer, that is, indicating turning off DRx-HARQ-RTT-TimerSL;
- indicating starting the second timer, that is, indicating starting Retransmission Timer;
- indicating that a resource selected by the second terminal is at least partially different from a previously selected resource, where after the second terminal performs resource selection or reselection, the resource selected by the second terminal is not necessarily different from a previously selected resource; or
- indicating that the second terminal has cancelled at least part of previously reserved resources.

In an implementation, after receiving the second indication information, the first terminal immediately stops running the first timer, enters DRX active time, and monitors control signaling and/or data.

In another implementation, after receiving the second indication information, the first terminal stops running the first timer after a corresponding time or a corresponding quantity of slots, enters DRX active time, and monitors control signaling and/or data.

In another implementation, after receiving the second indication information, the first terminal starts the second timer after a corresponding time or a corresponding quantity of slots, enters DRX active time, and monitors control signaling and/or data.

Therefore, this embodiment of this application provides a discontinuous reception method, where after the second indication information is received, the first timer is stopped and monitoring on the control signaling and/or data is performed, so that the first terminal can accurately receive the control signaling and/or data sent by the second terminal.

Based on the foregoing embodiment, optionally, in step S701, during monitoring of the control signaling and/or data, the method further includes:

- in a case that an initial-transmission resource and a retransmission resource have been indicated in the sidelink control information received, skipping monitoring control signaling and/or data during a third resource period; where the third resource period includes at least one of the following:

a period between an initial-transmission resource and a target retransmission resource;

a period between target retransmission resources; or a period between a resource on which feedback information is located and a target retransmission resource.

Optionally, during monitoring of the control signaling and/or data, the method further includes:

after fourth indication information is received from the base station or the second terminal, monitoring control signaling and/or data during the third resource period; where the fourth indication information is used for at least one of the following:

indicating the second terminal has performed a resource selection or reselection process;

indicating that the second terminal has triggered a resource selection or reselection process due to preemption; or indicating that the second terminal has triggered a resource selection or reselection process due to re-evaluation.

Therefore, this embodiment of this application provides a discontinuous reception method, where when the initial-transmission resource and the retransmission resource are indicated in the sidelink control information, the control signaling and/or data is not monitored during the third resource period, so that the first terminal can accurately receive the control signaling and/or data sent by the second terminal.

Based on the foregoing embodiment, optionally, in step S401, during monitoring of the control signaling and/or data, the method further includes:

after the sidelink control information received includes third indication information, no longer starting the first timer, and skipping monitoring control signaling and/or data during a third resource period; where the third indication information is used for at least one of the following:

indicating an initial-transmission resource and a retransmission resource; or indicating that a resource is a periodically reserved resource; and the third resource period includes at least one of the following:

a period between an initial-transmission resource and a target retransmission resource;

a period between target retransmission resources;

a period between a resource on which feedback information is located and a target retransmission resource; or a period between the last reserved resource of a period k and the 1st reserved resource of a period k+1.

Optionally, during monitoring of the control signaling and/or data, the method further includes:

after fourth indication information is received from the base station or the second terminal, monitoring control signaling and/or data during the third resource period; where the fourth indication information is used for at least one of the following:

indicating the second terminal has performed a resource selection or reselection process;

indicating that the second terminal has triggered a resource selection or reselection process due to preemption; or indicating that the second terminal has triggered a resource selection or reselection process due to re-evaluation.

Therefore, this embodiment of this application provides a discontinuous reception method, where according to the third indication information, the first timer is no longer started and monitoring on control signaling and/or data is not performed during the third resource period, so that the first terminal can accurately receive the control signaling and/or data sent by the second terminal.

Based on the foregoing embodiment, optionally, the first configuration information is determined by at least one of the following:

the first terminal;

a first base station corresponding to the first terminal;

the second terminal; or a second base station corresponding to the second terminal.

The first configuration information is obtained in multiple modes, including transmit-centric (TX-centric) mode and receive-centric (RX-centric) mode.

In Tx-centric mode, the method for obtaining the first configuration information is as follows:

The first terminal RX UE sends assistance information to the second terminal TX UE.

The DRX-related configuration of the second terminal may come from a base station in which the second terminal is located, or may be prescribed by the protocol, or may be pre-configured, or may be implemented based on the second terminal. The base station of the second terminal may be the same as or different from a base station of the first terminal.

Optionally, if the DRX configuration comes from the base station of the RX UE, the related configuration is sent to the TX UE through the RX UE, or sent to the TX UE based on the base station of the TX UE, so that the TX UE can learn about a DRX configuration status of the RX UE.

In Rx-centric mode, the method for obtaining the first configuration information is as follows:

The RX UE sends assistance information to the TX UE; and the base station of the RX UE or the TX UE sends the DRX related configuration to the RX UE.

The DRX related configuration of the TX UE may come from the base station of the TX UE, or may be prescribed by the protocol, or may be pre-configured, or may be implemented based on the TX UE. The base station of the TX UE may be the same as or difference from the base station of the RX UE.

Optionally, if the DRX configuration comes from the base station of the RX UE, the related configuration is sent to the TX UE through the RX UE, or sent to the TX UE based on the base station of the TX UE, so that the TX UE can learn about a DRX configuration status of the RX UE.

The configuration does not include an explicit Drx-HARQ-RTT-TimerSL configuration, but includes one piece of indication information. The indication information indicates that the RX UE uses X slots between the initial-transmission resource and the retransmission resource or between a specific retransmission resource and a next retransmission resource as slots corresponding to HARQ RTT, that is, the RX UE may not monitor the 2nd SCI on PSCCH and PSSCH in the X slots between the initial-transmission resource and the retransmission resource or between a specific retransmission resource and a next retransmission resource.

Therefore, this embodiment of this application provides a discontinuous reception method, where the first configuration information is obtained in a TX-centric mode or RX-centric mode, so that the first terminal can accurately receive the control signaling and/or data sent by the second terminal.

It should be noted that, in the discontinuous reception method provided by the embodiments of this application, the execution body may be a discontinuous reception apparatus, or a control module for executing the discontinuous reception method in the discontinuous reception apparatus. In the embodiments of this application, the discontinuous reception apparatus provided by the embodiments of this application is described by using the discontinuous reception method being performed by the discontinuous reception apparatus as an example.

Figure 8:
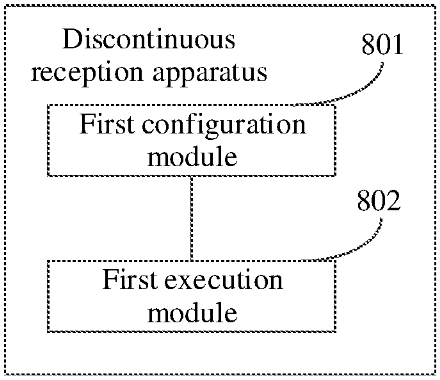
FIG. 8 is a schematic structural diagram of a discontinuous reception apparatus according to an embodiment of this application.

FIG. 8 shows a schematic structural diagram of a discontinuous reception apparatus according to an embodiment of this application. As shown in FIG. 8, the discontinuous reception apparatus includes: a first configuration module 801 and a first execution module 802.

The first configuration module 801 is configured to obtain first indication information and/or first configuration information for discontinuous reception. The first execution module 802 is configured to perform sidelink-based discontinuous reception for a second terminal according to first indication information and/or first configuration information for discontinuous reception, where the first configuration information includes configuration information of a timer, the timer is used to indicate whether the first terminal needs to monitor control signaling and/or data from the second terminal, and the first indication information includes sidelink control information and is used to indicate the first terminal to receive a first resource for initial transmission and retransmission and/or a feedback resource.

Therefore, this embodiment of this application provides a discontinuous reception method, where sidelink-based discontinuous reception is performed for the second terminal according to the first configuration information for discontinuous reception and/or the first indication information, so that the first terminal can accurately receive the control signaling and/or data sent by the second terminal.

Based on the foregoing embodiment, optionally, the first execution module is configured to: in a case that the first configuration information includes configuration information of a first timer and/or configuration information of a second timer, perform sidelink-based discontinuous reception based on the first timer; where the first timer is used to indicate that the first terminal does not need to monitor the control signaling and/or data from the second terminal during running of the first timer, the configuration information of the first timer includes a first duration used for indicating a timing length of the first timer, and the second timer is used to indicate that the first terminal needs to monitor the control signaling and/or data from the second terminal during running of the second timer.

Optionally, the first duration is determined based on at least one of the following:

- duration between two adjacent first resources;
- duration between a resource for sending feedback information and a next first resource;
- configuration made by a base station;
- specification by protocol; or
- configuration made by the second terminal.

Optionally, the first execution module is configured to start the first timer at a first time; and start the second timer after the first timer exceeds the first duration; where the first time is after at least one of the following time:

- the (n−1)-th first resource;
- a first quantity of symbols or slots after the (n−1)-th first resource;
- a resource on which feedback information sent for the (n−1)-th first resource is located; or
- a second quantity of symbols or slots after the resource on which the feedback information sent for the (n−1)-th first resource is located.

Optionally, during starting of the second timer, the first execution module is further configured:

- in a case that the m-th first resource having been occupied, due to pre-emption or re-evaluation, is detected, change a timing length of the second timer from a second duration to a third duration, or keep the second timer running until new control signaling and/or data is received; where the m-th first resource is the n-th first resource or is a first resource later than the n-th first resource.

Therefore, this embodiment of this application provides a discontinuous reception method, where sidelink-based discontinuous reception is performed based on the first timer, so that the first terminal can accurately receive the control signaling and/or data sent by the second terminal.

Based on the foregoing embodiment, optionally, the first execution module is configured to: in a case that the first configuration information includes configuration information of a second timer, perform sidelink-based discontinuous reception based on the second timer; where the second timer is used to indicate that the first terminal needs to monitor the control signaling and/or data from the second terminal during running of the second timer.

Optionally, the first execution module is configured to start the second timer on the n-th first resource, where a second duration of the second timer is determined based on at least one of the following:

- length of the first resource;
- configuration made by a base station;
- specification by protocol; or
- configuration made by the second terminal.

Optionally, the first execution module is further configured to:

- in a case that the m-th first resource having been occupied, due to pre-emption or re-evaluation, is detected, start the second timer and set a timing length of the second timer to a third duration, or keep the second timer running until new control signaling and/or data is received; where the m-th first resource is the n-th first resource or is a first resource later than the n-th first resource.

Therefore, this embodiment of this application provides a discontinuous reception method, where sidelink-based discontinuous reception is performed based on the second timer, so that the first terminal can accurately receive the control signaling and/or data sent by the second terminal.

Based on the foregoing embodiment, optionally, the first execution module is configured to: in a case that configuration information of a first timer is not present, perform sidelink-based discontinuous reception for the second terminal based on a position in which the first resource is located.

Optionally, the first execution module is configured to execute at least one of the following:

- monitoring control signaling and/or data from the second terminal at a position in which the n-th first resource is located; or
- not requiring to monitoring control signaling and/or data from the second terminal at a position in which the first resource is not located.

Optionally, the first execution module is further configured to: in a case that the m-th first resource having been occupied, due to pre-emption or re-evaluation, is detected, monitor the control signaling and/or data for a fourth duration or until new control signaling and/or data is received; where the m-th first resource is the n-th first resource or a first resource later than the n-th first resource.

Therefore, this embodiment of this application provides a discontinuous reception method, where sidelink-based discontinuous reception for the second terminal is performed based on the position in which the first resource is located, so that the first terminal can accurately receive the control signaling and/or data sent by the second terminal.

Based on the foregoing embodiment, optionally, after the first timer is started, the first execution module is further configured to: after second indication information is received from the base station or the second terminal, stop the first timer and monitor control signaling and/or data; where

- the second indication information is used for at least one of the following:
- indicating that the second terminal has performed a resource selection or reselection process;
- indicating that the second terminal has triggered a resource selection or reselection process due to pre-emption;
- indicating that the second terminal has triggered a resource selection or reselection process due to re-evaluation;
- indicating monitoring control signaling and/or data;
- indicating turning off the first timer;
- indicating starting the second timer;
- indicating that a resource selected by the second terminal is at least partially different from a previously selected resource; or
- indicating that the second terminal has cancelled at least part of previously reserved resources.

Therefore, this embodiment of this application provides a discontinuous reception method, where after the second indication information is received, the first timer is stopped and monitoring on the control signaling and/or data is performed, so that the first terminal can accurately receive the control signaling and/or data sent by the second terminal.

Based on the foregoing embodiment, optionally, during monitoring of the control signaling and/or data, the first execution module is further configured to: in a case that an initial-transmission resource and a retransmission resource have been indicated in the sidelink control information received, skip monitoring control signaling and/or data during a third resource period; where

- the third resource period includes at least one of the following:
- a period between an initial-transmission resource and a target retransmission resource;
- a period between target retransmission resources; or
- a period between a resource on which feedback information is located and a target retransmission resource.

Therefore, this embodiment of this application provides a discontinuous reception method, where when the initial-transmission resource and the retransmission resource are indicated in the sidelink control information, the control signaling and/or data is not monitored during the third resource period, so that the first terminal can accurately receive the control signaling and/or data sent by the second terminal.

Based on the foregoing embodiment, optionally, during monitoring of the control signaling and/or data, the first execution module is further configured to: after the sidelink control information received includes third indication information, no longer start the first timer, and skip monitoring control signaling and/or data during a third resource period; where

- the third indication information is used for at least one of the following:
- indicating an initial-transmission resource and a retransmission resource; or
- indicating that a resource is a periodically reserved resource; and
- the third resource period includes at least one of the following:
- a period between an initial-transmission resource and a target retransmission resource;
- a period between target retransmission resources;
- a period between a resource on which feedback information is located and a target retransmission resource; or
- a period between the last reserved resource of a period k and the 1st reserved resource of a period k+1.

Based on the foregoing embodiment, optionally, during monitoring of the control signaling and/or data, the first execution module is further configured to: after fourth indication information is received from the base station or the second terminal, monitor control signaling and/or data during the third resource period; where

- the fourth indication information is used for at least one of the following:
- indicating the second terminal has performed a resource selection or reselection process;
- indicating that the second terminal has triggered a resource selection or reselection process due to pre-emption; or
- indicating that the second terminal has triggered a resource selection or reselection process due to re-evaluation.

Therefore, this embodiment of this application provides a discontinuous reception method, where according to the third indication information, the first timer is no longer started and monitoring on control signaling and/or data is not performed during the third resource period, so that the first terminal can accurately receive the control signaling and/or data sent by the second terminal.

Based on the foregoing embodiment, optionally, the first configuration information is determined by at least one of the following:

- the first terminal;
- a first base station corresponding to the first terminal;
- the second terminal; or
- a second base station corresponding to the second terminal.

Therefore, this embodiment of this application provides a discontinuous reception method, where the first configuration information is obtained in a TX-centric mode or RX-centric mode, so that the first terminal can accurately receive the control signaling and/or data sent by the second terminal.

The discontinuous reception apparatus in this embodiment of this application may be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not limited in this embodiment of this application.

The discontinuous reception apparatus provided in this embodiment of this application can implement the processes implemented in the method embodiment in FIG. 2 to FIG. 7, with the same technical effects achieved. To avoid repetition, details are not described herein again.

Figure 9:
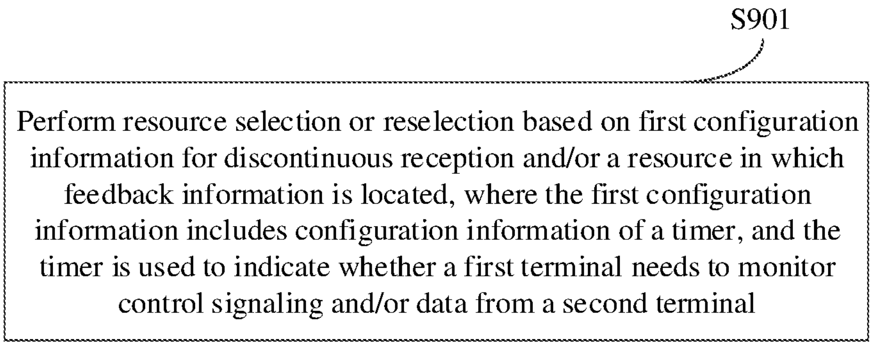
FIG. 9 is another schematic flowchart of a discontinuous reception method according to an embodiment of this application.

FIG. 9 shows another schematic flowchart of a discontinuous reception method according to an embodiment of this application. As shown in FIG. 9, the method may be executed by a second terminal, and for example, may be executed by software or hardware installed in the second terminal. The method may include the following step.

Step S901: Perform resource selection or reselection based on first configuration information for discontinuous reception and/or a resource on which feedback information is located; where the first configuration information includes configuration information of a timer, and the timer is used to indicate whether a first terminal needs to monitor control signaling and/or data from the second terminal.

Step S901 can implement the same method embodiment as step S201 in FIG. 2, with the same technical effects achieved, and to avoid repetition, details are not repeated herein.

Therefore, this embodiment of this application provides a discontinuous reception method, where based on the first configuration information for discontinuous reception and/or feedback information, the second terminal performs resource selection or reselection, so that the first terminal can accurately receive the control signaling and/or data sent by the second terminal.

Based on the foregoing embodiment, optionally, step S901 may include:

in a case that the first configuration information includes configuration information of a first timer and/or configuration information of a second timer, determining a position of a second resource based on the first timer and/or the resource on which feedback information is located, where the second resource is a transmission resource corresponding to a time of running the first timer of the first terminal; and selecting a transmission resource other than the second resource in a resource selection or reselection process.

Optionally, in a case that the n-th first resource having been occupied, due to pre-emption or re-evaluation, is detected, a transmission resource prior to the n-th first resource, including a transmission resource between the (n−1)-th first resource and the n-th first resource, is not selected during resource reselection.

Optionally, the skipping selecting the transmission resource prior to the n-th first resource during resource reselection includes:

setting a length between a start position of a resource selection window during resource reselection and a trigger time of the resource reselection, so that the second terminal does not select the transmission resource prior to the n-th first resource during resource reselection.

The foregoing step can implement the method embodiments in step S401 in FIG. 4 and step S501 in FIG. 5, and the repeated parts are not described herein.

Therefore, this embodiment of this application provides a discontinuous reception method, where the position of the second resource is determined based on the first timer and/or the resource on which the feedback information is located, and the transmission resource other than the second resource is selected during the resource selection or reselection process, so that the first terminal can accurately receive the control signaling and/or data sent by the second terminal.

Based on the foregoing embodiment, optionally, step S901 includes:

in a case that configuration information of a first timer is determined based on first indication information, determining a position of a second resource based on first information, where the second resource is a transmission resource corresponding to a time period in which the first terminal does not need to monitor control signaling and/or data; and selecting a transmission resource other than the second resource in a resource selection or reselection process; where the first information includes at least one of the following:

first indication information;

positions of an initial-transmission resource and a retransmission resource selected during last resource selection; or a position of the resource on which the feedback information is located.

The foregoing step can implement the method embodiment as step S701 in FIG. 7, with the same technical effects achieved, and to avoid repetition, details are not repeated herein.

Therefore, this embodiment of this application provides a discontinuous reception method, where the position of the second resource is determined based on the first information, so that the first terminal can accurately receive the control signaling and/or data sent by the second terminal.

Figure 10:
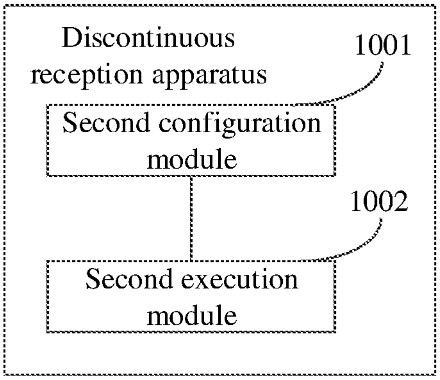
FIG. 10 is another schematic structural diagram of a discontinuous reception apparatus according to an embodiment of this application.

FIG. 10 shows another schematic structural diagram of a discontinuous reception apparatus according to an embodiment of this application. As shown in FIG. 10, the discontinuous reception apparatus includes: a second configuration module 1001 and a second execution module 1002.

The second configuration module 1001 is configured to obtain first configuration information for discontinuous reception and/or a resource on which feedback information is located; and the second execution module 1002 is configured to perform resource selection or reselection based on the first configuration information for discontinuous reception and/or the resource on which the feedback information is located; where the first configuration information includes configuration information of a timer, and the timer is used to indicate whether a first terminal needs to monitor control signaling and/or data from a second terminal.

Therefore, this embodiment of this application provides a discontinuous reception method, where based on the first configuration information for discontinuous reception and/or feedback information, the second terminal performs resource selection or reselection, so that the first terminal can accurately receive the control signaling and/or data sent by the second terminal.

Based on the foregoing embodiment, optionally, the second execution module is configured to: in a case that the first configuration information includes configuration information of a first timer and/or configuration information of a second timer, determine a position of a second resource based on the first timer and/or the resource on which the feedback information is located, where the second resource is a transmission resource corresponding to a time of running the first timer of the first terminal; and select a transmission resource other than the second resource in a resource selection or reselection process.

Optionally, in a case that the n-th first resource having been occupied, due to pre-emption or re-evaluation, is detected, a transmission resource prior to the n-th first resource is not selected during resource reselection.

Optionally, the skipping selecting a transmission resource prior to the n-th first resource during resource reselection includes:

setting a length between a start position of a resource selection window during resource reselection and a trigger time of the resource reselection, so that the second terminal does not select the transmission resource prior to the n-th first resource during resource reselection.

Therefore, this embodiment of this application provides a discontinuous reception method, where the position of the second resource is determined based on the first timer and/or the resource on which the feedback information is located, and the transmission resource other than the second resource is selected during the resource selection or reselection process, so that the first terminal can accurately receive the control signaling and/or data sent by the second terminal.

Optionally, the second execution module is configured to: in a case that configuration information of a first timer is determined based on first indication information, determine a position of a second resource based on first information, where the second resource is a transmission resource corresponding to a time period in which the first terminal does not need to monitor control signaling and/or data; and select a transmission resource other than the second resource in a resource selection or reselection process; where the first information includes at least one of the following:

first indication information;

positions of an initial-transmission resource and a retransmission resource selected during last resource selection; or a position of the resource on which the feedback information is located.

Therefore, this embodiment of this application provides a discontinuous reception method, where the position of the second resource is determined based on the first information, so that the first terminal can accurately receive the control signaling and/or data sent by the second terminal.

The discontinuous reception apparatus in this embodiment of this application may be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not limited in this embodiment of this application.

The discontinuous reception apparatus provided in this embodiment of this application can implement the processes implemented in the method embodiment in FIG. 9, with the same technical effects achieved. To avoid repetition, details are not described herein again.

Figure 11:
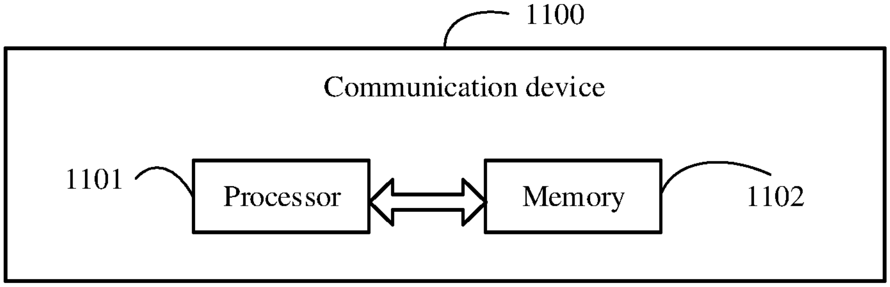
FIG. 11 is a schematic structural diagram of a communication device according to an embodiment of this application.

Optionally, as shown in FIG. 11, an embodiment of this application further provides a communication device 1100, including a processor 1101, a memory 1102, and a program or instructions stored in the memory 1102 and executable on the processor 1101. For example, when the communication device 1100 is a terminal and when the program or the instructions are executed by the processor 1101, the processes of the foregoing embodiment of the discontinuous reception method are implemented, with the same technical effects achieved. When the communication device 1100 is a network-side device and when the program or the instructions are executed by the processor 1101, the processes of the foregoing embodiment of the discontinuous reception method are implemented, with the same technical effects achieved. To avoid repetition, details are not described herein again.

Figure 12:
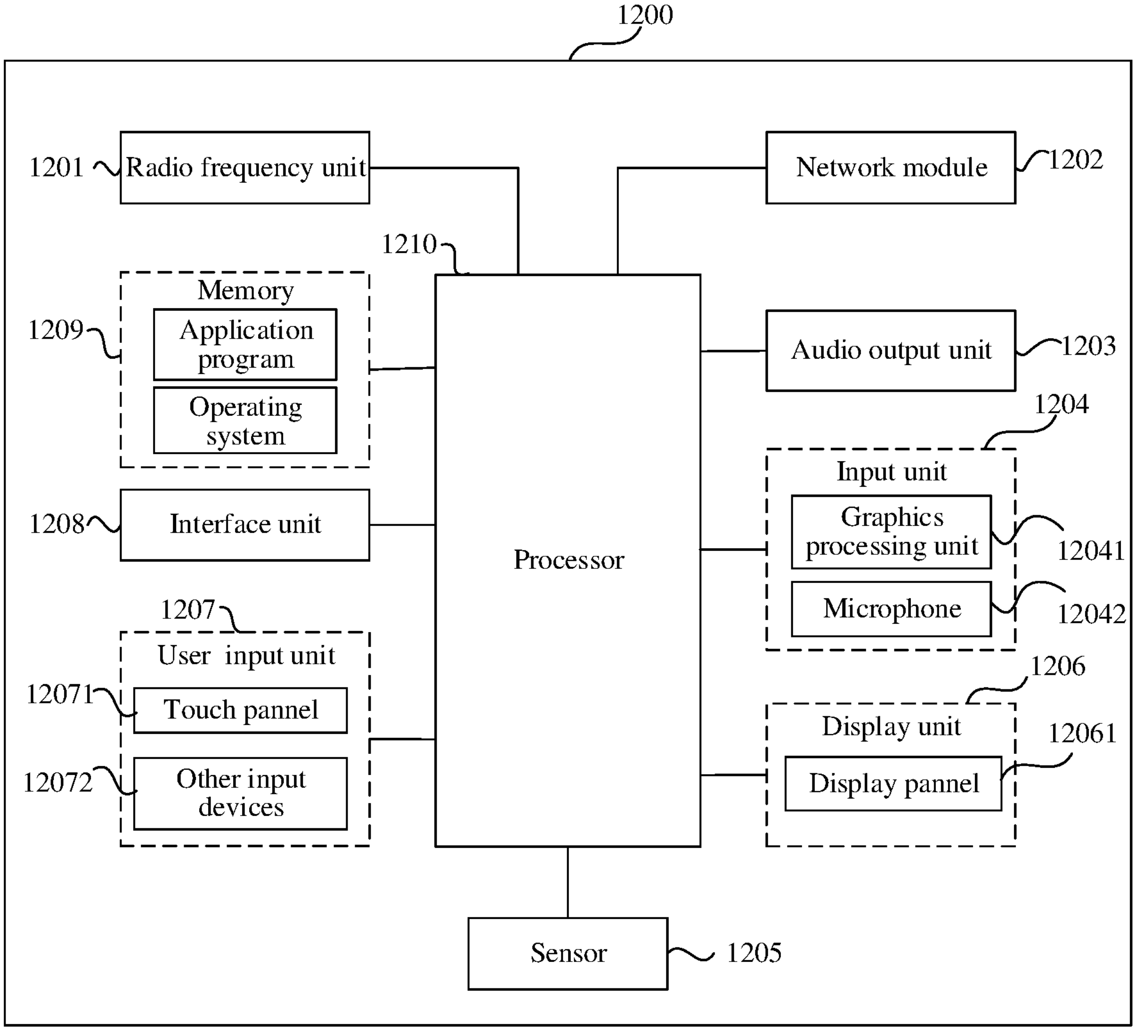
FIG. 12 is a schematic structural diagram of a first terminal for implementing the embodiments of this application.

An embodiment of this application further provides a terminal, including a processor and a communication interface, and the processor is configured to perform sidelink-based discontinuous reception for a second terminal based on first indication information and/or first configuration information for discontinuous reception, and the communication interface is configured to perform sidelink-based discontinuous reception for the second terminal. The terminal embodiments correspond to the foregoing terminal-side method embodiments, and the implementation processes and implementations of the foregoing method embodiments can be applied to the terminal embodiments, with the same technical effects achieved. For example, FIG. 12 is a schematic diagram of a hardware structure of a first terminal for implementing the embodiments of this application.

The terminal 1200 includes but is not limited to at least part of components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

Persons skilled in the art can understand that the terminal 1200 may further include a power supply (for example, a battery) supplying power to the components, and the power supply may be logically connected to the processor 1210 through a power management system. In this way, functions such as charge management, discharge management, and power consumption management are implemented by using the power management system. The structure of the terminal shown in FIG. 12 does not constitute any limitation on the terminal. The terminal may include more or fewer components than shown in the figure, or a combination of some components, or the components disposed differently. Details are not described herein again.

It can be understood that in this embodiment of this application, the input unit 1204 may include a graphics processing unit (GPU) 12041 and a microphone 12042. The graphics processing unit 12041 processes image data of a still picture or video obtained by an image capture apparatus (such as a camera) in a video capture mode or an image capture mode. The display unit 1206 may include a display panel 12061, and the display panel 12061 may be configured in a form of a liquid crystal display, an organic light-emitting diode, and the like. The user input unit 1207 may include a touch panel 12071 and other input devices 12072. The touch panel 12071 is also referred to as a touchscreen. The touch panel 12071 may include two parts: a touch detection apparatus and a touch controller. The other input devices 12072 may include but are not limited to a physical keyboard, a function key (such as a volume control key or a power on/off key), a trackball, a mouse, a joystick, and the like. Details are not described herein.

In this embodiment of this application, the radio frequency unit 1201 receives downlink data from a network-side device, and then sends the downlink data to the processor 1210 for processing; and also sends uplink data to the network-side device. Generally, the radio frequency unit 1201 includes but is not limited to an antenna, at least one amplifier, a transceiver, a coupler, a low noise amplifier, a duplexer, and the like.

The memory 1209 may be configured to store software programs or instructions and various data. The memory 1209 may include a program or instruction storage area and a data storage area. The program or instruction storage area may store an operating system, an application program or instruction required by at least one function (for example, a sound playback function or an image playback function), and the like. In addition, the memory 1209 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 1210 may include one or more processing units. Optionally, an application processor and a modem processor may be integrated in the processor 1210. The application processor primarily processes an operating system, user interfaces, application programs or instructions, and the like. The modem processor primarily processes radio communication, for example, being a baseband processor. It can be understood that the modem processor may alternatively be not integrated in the processor 110.

The radio frequency unit 1201 is configured to perform sidelink-based discontinuous reception for a second terminal according to first indication information and/or first configuration information for discontinuous reception.

According to this embodiment of this application, the first terminal can accurately receive the control signaling and/or data sent by the second terminal.

Optionally, the radio frequency unit 1201 is further configured to in a case that the first configuration information includes configuration information of a first timer and/or configuration information of a second timer, perform sidelink-based discontinuous reception based on the first timer.

Optionally, the first duration is determined based on at least one of the following:

duration between two adjacent first resources;

duration between a resource for sending feedback information and a next first resource;

configuration made by a base station;

specification by protocol; or configuration made by the second terminal.

Optionally, the radio frequency unit 1201 is further configured to: start the first timer at a first time; and start the second timer after the first timer exceeds the first duration; where the first time is after at least one of the following time:

the (n−1)-th first resource;

a first quantity of symbols or slots after the (n−1)-th first resource;

a resource on which feedback information sent for the (n−1)-th first resource is located; or a second quantity of symbols or slots after the resource on which the feedback information sent for the (n−1)-th first resource is located.

Optionally, the radio frequency unit 1201 is further configured to: in a case that the m-th first resource having been occupied, due to pre-emption or re-evaluation, is detected, change a timing length of the second timer from a second duration to a third duration, or keep the second timer running until new control signaling and/or data is received; where the m-th first resource is the n-th first resource or is a first resource later than the n-th first resource.

According to this embodiment of this application, the first terminal can accurately receive the control signaling and/or data sent by the second terminal.

Optionally, the radio frequency unit 1201 is further configured to: in a case that the first configuration information includes configuration information of a second timer, perform sidelink-based discontinuous reception based on the second timer; where the second timer is used to indicate that the first terminal needs to monitor the control signaling and/or data from the second terminal during running of the second timer.

Optionally, the radio frequency unit 1201 is further configured to: start the second timer on the n-th first resource, where a second duration of the second timer is determined based on at least one of the following:

length of the first resource;

configuration made by a base station;

specification by protocol; or configuration made by the second terminal.

Optionally, the radio frequency unit 1201 is further configured to: in a case that the m-th first resource having been occupied, due to pre-emption or re-evaluation, is detected, starting the second timer and setting a timing length of the second timer to a third duration, or keeping the second timer running until new control signaling and/or data is received; where the m-th first resource is the n-th first resource or is a first resource later than the n-th first resource.

Optionally, the radio frequency unit 1201 is further configured to: in a case that configuration information of a first timer is not present, perform sidelink-based discontinuous reception for the second terminal based on a position in which the first resource is located.

Optionally, the radio frequency unit 1201 is further configured to:

monitor control signaling and/or data from the second terminal at a position in which the n-th first resource is located; and not require to monitoring control signaling and/or data from the second terminal at a position in which the first resource is not located.

Optionally, the radio frequency unit 1201 is further configured to: in a case that the m-th first resource having been occupied, due to pre-emption or re-evaluation, is detected, monitor the control signaling and/or data for a fourth duration or until new control signaling and/or data is received; where the m-th first resource is the n-th first resource or a first resource later than the n-th first resource.

Optionally, the radio frequency unit 1201 is further configured to: after the first timer is started, after second indication information is received from the base station or the second terminal, stop the first timer and monitor control signaling and/or data; where the second indication information is used for at least one of the following:

indicating that the second terminal has performed a resource selection or reselection process;

indicating that the second terminal has triggered a resource selection or reselection process due to pre-emption;

indicating that the second terminal has triggered a resource selection or reselection process due to re-evaluation;

indicating monitoring control signaling and/or data;

indicating turning off the first timer;

indicating starting the second timer;

indicating that a resource selected by the second terminal is at least partially different from a previously selected resource; or indicating that the second terminal has cancelled at least part of previously reserved resources.

Optionally, the radio frequency unit 1201 is further configured to: in a case that an initial-transmission resource and a retransmission resource have been indicated in the sidelink control information received, skip monitoring control signaling and/or data during a third resource period; where the third resource period includes at least one of the following:

a period between an initial-transmission resource and a target retransmission resource;

a period between target retransmission resources; or a period between a resource on which feedback information is located and a target retransmission resource.

Optionally, the radio frequency unit 1201 is further configured to: after the sidelink control information received includes third indication information, no longer start the first timer, and skip monitoring control signaling and/or data during a third resource period; where the third indication information is used for at least one of the following:

indicating an initial-transmission resource and a retransmission resource; or indicating that a resource is a periodically reserved resource; and the third resource period includes at least one of the following:

a period between an initial-transmission resource and a target retransmission resource;

a period between target retransmission resources;

a period between a resource on which feedback information is located and a target retransmission resource; or a period between the last reserved resource of a period k and the 1st reserved resource of a period k+1.

Optionally, during monitoring of the control signaling and/or data, the radio frequency unit 1201 is further configured to:

after fourth indication information is received from the base station or the second terminal, monitor control signaling and/or data during the third resource period; where the fourth indication information is used for at least one of the following:

indicating the second terminal has performed a resource selection or reselection process;

indicating that the second terminal has triggered a resource selection or reselection process due to preemption; or indicating that the second terminal has triggered a resource selection or reselection process due to re-evaluation.

Optionally, the first configuration information is determined by at least one of the following:

the first terminal;

a first base station corresponding to the first terminal;

the second terminal; or a second base station corresponding to the second terminal.

According to this embodiment of this application, the first terminal can accurately receive the control signaling and/or data sent by the second terminal.

Figure 13:
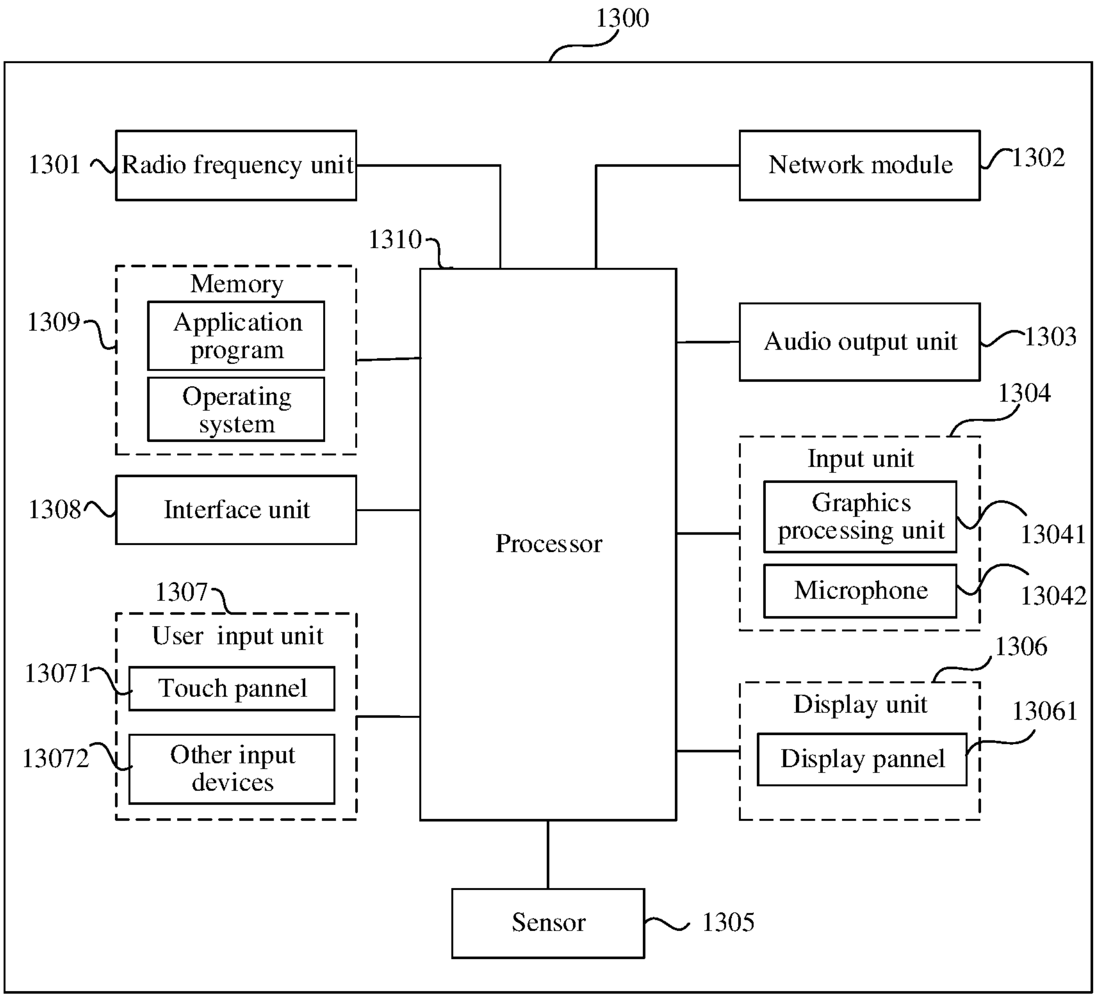
FIG. 13 is a schematic structural diagram of a second terminal for implementing the embodiments of this application.

An embodiment of this application further provides another terminal, including a processor and a communication interface. The processor is configured to perform sidelink-based discontinuous reception for a second terminal based on first indication information and/or first configuration information for discontinuous reception, and the communication interface is configured to perform sidelink-based discontinuous reception for the second terminal. The terminal embodiments correspond to the foregoing terminal-side method embodiments, and the implementation processes and implementations of the foregoing method embodiments can be applied to the terminal embodiments, with the same technical effects achieved. For example, FIG. 13 is a schematic diagram of a hardware structure of a second terminal for implementing the embodiments of this application.

The terminal 1300 includes but is not limited to at least part of components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

Persons skilled in the art can understand that the terminal 1300 may further include a power supply (for example, a battery) supplying power to the components, and the power supply may be logically connected to the processor 1310 through a power management system. In this way, functions such as charge management, discharge management, and power consumption management are implemented by using the power management system. The structure of the terminal shown in FIG. 13 does not constitute any limitation on the terminal. The terminal may include more or fewer components than shown in the figure, or a combination of some components, or the components disposed differently. Details are not described herein again.

It can be understood that in this embodiment of this application, the input unit 1304 may include a graphics processing unit (GPU) 13041 and a microphone 13042. The graphics processing unit 13041 processes image data of a still picture or video obtained by an image capture apparatus (such as a camera) in a video capture mode or an image capture mode. The display unit 1306 may include a display panel 13061, and the display panel 13061 may be configured in a form of a liquid crystal display, an organic light-emitting diode, and the like. The user input unit 1307 may include a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a function key (such as a volume control key or a power on/off key), a trackball, a mouse, a joystick, and the like. Details are not described herein.

In this embodiment of this application, the radio frequency unit 1301 receives downlink data from a network-side device, and then sends the downlink data to the processor 1310 for processing; and also sends uplink data to the network-side device. Generally, the radio frequency unit 1301 includes but is not limited to an antenna, at least one amplifier, a transceiver, a coupler, a low noise amplifier, a duplexer, and the like.

The memory 1309 may be configured to store software programs or instructions and various data. The memory 1309 may include a program or instruction storage area and a data storage area. The program or instruction storage area may store an operating system, an application program or instruction required by at least one function (for example, a sound playback function or an image playback function), and the like. In addition, the memory 1309 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 1310 may include one or more processing units. Optionally, an application processor and a modem processor may be integrated in the processor 1310. The application processor primarily processes an operating system, user interfaces, application programs or instructions, and the like. The modem processor primarily processes radio communication, for example, being a baseband processor. It can be understood that the modem processor may alternatively be not integrated in the processor 110.

The processor 1310 is configured to perform resource selection or reselection based on first configuration information for discontinuous reception and/or a resource on which feedback information is located.

According to this embodiment of this application, the first terminal can accurately receive the control signaling and/or data sent by the second terminal.

Optionally, the processor 1310 is further configured to: in a case that the first configuration information includes configuration information of a first timer and/or configuration information of a second timer, determine a position of a second resource based on the first timer and/or the resource on which the feedback information is located, where the second resource is a transmission resource corresponding to a time of running the first timer of the first terminal; and select a transmission resource other than the second resource in a resource selection or reselection process.

Optionally, the processor 1310 is further configured to: in a case that the n-th first resource having been occupied, due to pre-emption or re-evaluation, is detected, not select a transmission resource prior to the n-th first resource during resource reselection.

Optionally, the processor 1310 is further configured to: set a length between a start position of a resource selection window during resource reselection and a trigger time of the resource reselection, so that the second terminal does not select the transmission resource prior to the n-th first resource during resource reselection.

Optionally, the processor 1310 is further configured to: in a case that configuration information of a first timer is determined based on first indication information, determine a position of a second resource based on first information, where the second resource is a transmission resource corresponding to a time period in which the first terminal does not need to monitor control signaling and/or data; and select a transmission resource other than the second resource in a resource selection or reselection process; where the first information includes at least one of the following: first indication information;

positions of an initial-transmission resource and a retransmission resource selected during last resource selection; or a position of the resource on which the feedback information is located.

According to this embodiment of this application, the first terminal can accurately receive the control signaling and/or data sent by the second terminal.

An embodiment of the present application further provides a non-transitory computer-readable storage medium, where a program or instructions are stored in the non-transitory computer-readable storage medium. When the program or instructions are executed by a processor, the processes of the foregoing discontinuous reception method embodiment can be implemented, with same technical effects achieved. To avoid repetition, details are not described herein again.

The processor is a processor in the terminal described in the foregoing embodiments. The non-transitory computer-readable storage medium includes a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the foregoing discontinuous reception method embodiments, with the same technical effects achieved. To avoid repetition, details are not repeated herein.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A discontinuous reception method, performed by a first terminal and comprising:

performing sidelink-based discontinuous reception for a second terminal according to first indication information and/or first configuration information for discontinuous reception, wherein the first configuration information comprises configuration information of a timer, the timer is used to indicate whether the first terminal needs to monitor control signaling and/or data from the second terminal, and the first indication information comprises sidelink control information and is used to indicate the first terminal to receive a first resource for initial transmission and retransmission and/or a feedback resource; wherein the performing sidelink-based discontinuous reception for a second terminal according to first indication information and/or first configuration information for discontinuous reception comprises:

in a case that the first configuration information comprises configuration information of a first timer and configuration information of a second timer, performing sidelink-based discontinuous reception based on the first timer; wherein the first timer is used to indicate that the first terminal does not need to monitor the control signaling and/or data from the second terminal during running of the first timer, the configuration information of the first timer comprises a first duration used for indicating a timing length of the first timer, and the second timer is used to indicate that the first terminal needs to monitor the control signaling and/or data from the second terminal during running of the second timer;

the first duration is determined based on at least one of the following: duration between two adjacent first resources, or duration between a resource for sending feedback information and a next first resource; and the performing sidelink-based discontinuous reception based on the first timer comprises:

starting the first timer at a first time; and starting the second timer after the first timer exceeds the first duration; wherein the first time is after at least one of the following time:

the (n−1)-th first resource; or a second quantity of symbols or slots after the resource on which the feedback information sent for the (n-1)-th first resource is located.

2. The method according to claim 1, wherein during starting of the second timer, the method further comprises:

in a case that the m-th first resource having been occupied, due to pre-emption or re-evaluation, is detected, changing a timing length of the second timer from a second duration to a third duration, or keeping the second timer running until new control signaling and/or data is received; wherein the m-th first resource is the n-th first resource or is a first resource later than the n-th first resource.

3. The method according to claim 1, wherein the performing sidelink-based discontinuous reception for a second terminal according to first indication information and/or first configuration information for discontinuous reception comprises:

performing sidelink-based discontinuous reception based on the second timer; wherein the second timer is used to indicate that the first terminal needs to monitor the control signaling and/or data from the second terminal during running of the second timer.

4. The method according to claim 3, wherein the performing sidelink-based discontinuous reception based on the second timer comprises:

starting the second timer on the n-th first resource, wherein a second duration of the second timer is determined based on at least one of the following:

length of the first resource;

configuration made by a base station;

specification by protocol; or configuration made by the second terminal.

5. The method according to claim 4, wherein the method further comprises:

in a case that the m-th first resource having been occupied, due to pre-emption or re-evaluation, is detected, starting the second timer and setting a timing length of the second timer to a third duration, or keeping the second timer running until new control signaling and/or data is received; wherein the m-th first resource is the n-th first resource or is a first resource later than the n-th first resource.

6. The method according to claim 1, wherein after the starting the first timer, the method further comprises:

after second indication information is received from the base station or the second terminal, stopping the first timer and monitoring control signaling and/or data; wherein the second indication information is used for at least one of the following:

indicating that the second terminal has performed a resource selection or reselection process;

indicating that the second terminal has triggered a resource selection or reselection process due to pre-emption;

indicating that the second terminal has triggered a resource selection or reselection process due to re-evaluation;

indicating monitoring control signaling and/or data;

indicating turning off the first timer;

indicating starting the second timer;

indicating that a resource selected by the second terminal is at least partially different from a previously selected resource; or indicating that the second terminal has cancelled at least part of previously reserved resources.

7. The method according to claim 6, wherein during monitoring of the control signaling and/or data, the method further comprises:

in a case that an initial-transmission resource and a retransmission resource have been indicated in the sidelink control information received, skipping monitoring control signaling and/or data during a third resource period; wherein the third resource period comprises at least one of the following:

a period between an initial-transmission resource and a target retransmission resource;

a period between target retransmission resources; or a period between a resource on which feedback information is located and a target retransmission resource.

8. The method according to claim 1, wherein during monitoring of the control signaling and/or data, the method further comprises:

after the sidelink control information received comprises third indication information, no longer starting the first timer, and skipping monitoring control signaling and/or data during a third resource period; wherein the third indication information is used for at least one of the following:

indicating an initial-transmission resource and a retransmission resource; or indicating that a resource is a periodically reserved resource; and the third resource period comprises at least one of the following:

a period between an initial-transmission resource and a target retransmission resource;

a period between target retransmission resources;

a period between a resource on which feedback information is located and a target retransmission resource; or a period between the last reserved resource of a period k and the 1st reserved resource of a period k+1.

9. The method according to claim 7, wherein during monitoring of the control signaling and/or data, the method further comprises:

after fourth indication information is received from the base station or the second terminal, monitoring control signaling and/or data during the third resource period; wherein the fourth indication information is used for at least one of the following:

indicating the second terminal has performed a resource selection or reselection process;

indicating that the second terminal has triggered a resource selection or reselection process due to preemption; or indicating that the second terminal has triggered a resource selection or reselection process due to re-evaluation.

10. The method according to claim 1, wherein the first configuration information is determined by at least one of the following:

the first terminal;

a first base station corresponding to the first terminal;

the second terminal; or a second base station corresponding to the second terminal.

11. A discontinuous reception method, performed by a second terminal and comprising:

performing resource selection or reselection based on first configuration information for discontinuous reception and/or a resource on which feedback information is located; wherein the first configuration information comprises configuration information of a timer, and the timer is used to indicate whether a first terminal needs to monitor control signaling and/or data from the second terminal; wherein the performing resource selection or reselection based on first configuration information for discontinuous reception and/or a resource on which feedback information is located comprises:

in a case that the first configuration information comprises configuration information of a first timer and/or configuration information of a second timer, determining a position of a second resource based on the first timer and/or the resource on which the feedback information is located, wherein the second resource is a transmission resource corresponding to a time of running the first timer of the first terminal; and selecting a transmission resource other than the second resource in a resource selection or reselection process; wherein the first timer is used to indicate that the first terminal does not need to monitor the control signaling and/or data from the second terminal during running of the first timer, the configuration information of the first timer comprises a first duration used for indicating a timing length of the first timer, and the second timer is used to indicate that the first terminal needs to monitor the control signaling and/or data from the second terminal during running of the second timer; and the first duration is determined based on at least one of the following: duration between two adjacent first resources, or duration between a resource for sending feedback information and a next first resource.

12. The method according to claim 11, wherein in a case that the n-th first resource having been occupied, due to pre-emption or re-evaluation, is detected, a transmission resource prior to the n-th first resource is not selected during resource reselection; wherein skipping selecting the transmission resource prior to the n-th first resource during resource reselection comprises:

setting a length between a start position of a resource selection window during resource reselection and a trigger time of the resource reselection, so that the second terminal does not select the transmission resource prior to the n-th first resource during resource reselection.

13. The method according to claim 11, wherein the performing resource selection or reselection based on first configuration information for discontinuous reception and/or a resource on which feedback information is located comprises:

in a case that configuration information of a first timer is determined based on first indication information, determining a position of a second resource based on first information, wherein the second resource is a transmission resource corresponding to a time period in which the first terminal does not need to monitor control signaling and/or data; and selecting a transmission resource other than the second resource in a resource selection or reselection process; wherein the first information comprises at least one of the following:

first indication information;

positions of an initial-transmission resource and a retransmission resource selected during last resource selection; or a position of the resource on which the feedback information is located.

* * * * *